June 28, 1949.  W. FOERSTE  2,474,624
COMPENSATED MAGNETIC-LEAKAGE-TYPE TRANSFORMER
Filed Jan. 14, 1946
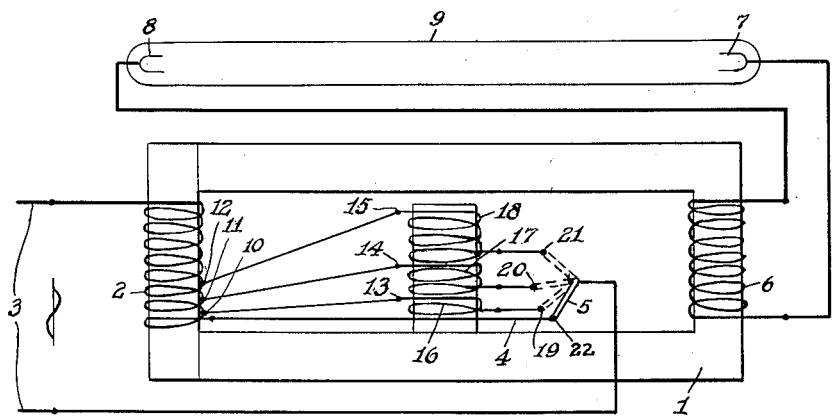
INVENTOR.
WILLIAM FOERSTE
BY
ATTORNEY.

Patented June 28, 1949

2,474,624

UNITED STATES PATENT OFFICE 2,474,624

COMPENSATED MAGNETIC-LEAKAGE-TYPE TRANSFORMER

William Foerste, Pelham Manor, N. Y.; Anna Kane, administratrix of said William Foerste, deceased, assignor of one-half to Eugene A. Quarrie, Scarsdale, N. Y.

Application January 14, 1946, Serial No. 641,134

4 Claims. (Cl. 323—44)

1

The invention relates to transformers of the magnetic-leakage-type suitable more particularly for use in the operation of rare-gas-filled lamps of the ordinary luminescent type as well as of the fluorescent type, wherein to effect the illumination an electrical discharge is provided, as secured from the secondary of the transformer, between electrodes located at opposite ends of an envelope containing a suitable gaseous medium. In my prior Patent #2,392,845 there is disclosed a transformer having a single primary and at least one secondary, together with a control circuit associated therewith whereby, through means such as a variable reactor magnetically positioned between the primary and secondary of the transformer, the load on said single primary is controlled to vary the intensity of illumination of a lamp in a manner to maintain substantially constant and relatively high the open-circuit voltage for ionization of the gaseous medium within the lamp envelope.

It has been found that in some instances the reactive voltage drop in reactor coils of the variable reactor of such transformer may cause unstable operation of certain types of gaseous luminescent lamps. In fact, in some cases it is desirable to have a higher ionization voltage at the reduced intensity of illumination stages.

It is an object of the invention to compensate for the reactance effect on the open-circuit voltage, due to primary core load changes, so as to maintain said open-circuit, ionization voltage, or even to increase the same if necessary.

It is a further object of the invention to provide means with respect to one of the windings of a transformer of the aforesaid type whereby the ratio between the number of turns of the primary and secondary windings of the transformer is increased, as the reactive effect is increased, to compensate for the voltage drop produced in the secondary winding as a result of the reactive effect.

In carrying out the invention, reactor coils or windings associated with, for example, a high reluctance variable reactor in shunt magnetic relationship with the transformer core, are tapped in on various end-of-coil taps of the primary winding of the transformer in a manner such that as the number of turns of the reactor are increased the number of turns of the primary are proportionally decreased, thereby increasing the secondary open-circuit voltage, and vice versa.

The nature of the invention, however, will best be understood when described in connection with the accompanying drawing which is a diagrammatic view illustrating the novel compensated transformer and wiring, and as applied in the operation of a luminescent lamp for securing four different intensities of illumination of said lamp.

Referring to the drawing, 1 designates the closed core structure of a transformer, which may be constructed in the usual manner of laminated iron, said core affording a closed magnetic circuit. A primary winding 2 is provided thereon and derives its power from the main 3 through a lead 4 and a switch-arm 5. A secondary winding 6 is also provided on the core, and is shown as connected directly to the electrodes 7 and 8, either of the hot or cold type, of a luminescent lamp including a transparent envelope 9. Winding 6 is thus in inductive relationship to the primary and supplies the lamp with the requisite voltage for its proper operation.

In the operation of these lamps it is understood that an initially high voltage must be supplied by the secondary to effect ionization of the rare gas in the envelope, this voltage during each half cycle of operation then dropping to a much lower sustaining or working value when the lamp is in service.

In accordance with the invention, end-of-coil taps 10, 11 and 12 are taken from the primary winding 2, consecutively reducing thereby the effective number of primary turns. These taps are adapted to be connected, respectively, with the free terminals 13, 14 and 15 of reactor coils 16, 17 and 18 whose other terminals are connected to switch contacts 19, 20 and 21, respectively, and associated with the switch-arm 5 to place a corresponding coil in series with the appropriate portion of the primary winding 2.

The said coils are connected, preferably so as to aid the primary and/or secondary flux, as is well understood.

Due to the simultaneous adjustment by said switch-arm of the number of primary turns with respect to the reactive effect produced by the corresponding reactor coil in accordance with the particular switch-arm setting, a change results in the primary-secondary ratio of number of turns. This will compensate, or over compensate, where desirable, for the shunt coil voltage drop and reactive drop so that proper open-circuit voltage is maintained for ionization in the illumination of the lamp at the desired light intensity. When the switch-arm 5 is on the lead contact 22, the full primary winding is in circuit and all of the reactor coils are excluded.

It will be understood, of course, that the alteration of the turns ratio of the primary-secondary windings may similarly be effected with respect to the latter winding rather than with respect to the primary winding as set forth. The end-of-coil taps are then arranged to increase the number of turns of the secondary winding with increase in reactive effect, for example, by reversing the input and output connections of the primary and secondary of the transformer shown in the drawing. The reactive drop in this instance, however, is much less than in the case of the control through the primary winding and the compensation, therefore, not so essential.

I claim:

1. A magnetic-leakage-type transformer, comprising a closed magnetic core having a primary winding with a plurality of taps intermediate its terminals, and a secondary winding; a variable reactor magnetically positioned between the primary and secondary windings and separated from said closed magnetic core by a non-magnetic gap for shunting from said secondary winding a portion of the flux generated by said primary winding, and including a coil thereon with taps equal in number to the said primary taps; a source of electrical energy supply; and switching means for connecting alternatively thereto either the entire winding of the primary, or, selected taps thereof in series with corresponding taps of the reactor.

2. A magnetic leakage type transformer according to claim 1, wherein the respective tapped coil portions have different numbers of turns.

3. A magnetic leakage type transformer according to claim 2, wherein the turns progressively increase.

4. A magnetic leakage type transformer, comprising a closed magnetic core having a primary winding with a plurality of taps intermediate its terminals, and a secondary winding; a variable reactor magnetically positioned between the primary and secondary windings and separated from said closed magnetic core by a non-magnetic gap for shunting from said secondary winding a portion of the flux generated by said primary winding, and including a coil thereon with taps equal in number to the said primary taps; a source of electrical energy supply, one lead thereof being connected to one of the primary terminals; and switching means including a movable switch arm and switch points in number exceeding by one the number of taps, one of the points being connected with the other terminal of the primary winding and the remaining points with one terminal of the respective reactor coil portions, the other terminal of the coil portions being connected respectively with the primary winding taps, and the switch arm with the other lead of the source of power.

WILLIAM FOERSTE.

REFERENCES CITED

The following references are of record in the file of this patent:

UNITED STATES PATENTS

| Number | Name | Date |
| --- | --- | --- |
| 1,679,263 | Owen | July 31, 1928 |